United States Patent
Goulet et al.

(10) Patent No.: US 10,956,175 B2
(45) Date of Patent: Mar. 23, 2021

(54) BOOT PROCESS MODIFICATION

(71) Applicant: HEWLETT-PACKARD DEVELOPMENT COMPANY, L.P., Houston, TX (US)

(72) Inventors: Michael Anthony Goulet, Houston, TX (US); Michael J Frick, Houston, TX (US); Matthieu Clemenceau, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 270 days.

(21) Appl. No.: 15/761,355

(22) PCT Filed: Jan. 8, 2016

(86) PCT No.: PCT/US2016/012719
§ 371 (c)(1),
(2) Date: Mar. 19, 2018

(87) PCT Pub. No.: WO2017/119907
PCT Pub. Date: Jul. 13, 2017

(65) Prior Publication Data
US 2018/0314529 A1    Nov. 1, 2018

(51) Int. Cl.
*G06F 9/44* (2018.01)
*G06F 9/4401* (2018.01)
(52) U.S. Cl.
CPC .................................. *G06F 9/441* (2013.01)
(58) Field of Classification Search
None
See application file for complete search history.

(56) References Cited

U.S. PATENT DOCUMENTS

| | | | |
|---|---|---|---|
| 6,205,513 B1 | 3/2001 | Godicke et al. | |
| 7,543,168 B1 | 6/2009 | Thompson | |
| 8,225,079 B2 | 7/2012 | Smith et al. | |
| 8,738,786 B2 | 5/2014 | Lee | |
| 9,324,234 B2* | 4/2016 | Ricci | G08G 1/017 |
| 9,348,633 B2* | 5/2016 | Galicia | G06F 9/45537 |
| 9,588,936 B1* | 3/2017 | Morris | G06F 3/061 |
| 2004/0019823 A1 | 1/2004 | Gere | |

(Continued)

FOREIGN PATENT DOCUMENTS

| | | |
|---|---|---|
| CN | 102902928 A | 1/2013 |
| EP | 2487588 A1 | 8/2012 |

OTHER PUBLICATIONS

Cobb—"Utilize Windows 8 Elam to Secure the Boot Process, Detect Rootkits"—http://searchsecurity.techtarget.com—Mar. 15, 2013—4 pages.

(Continued)

*Primary Examiner* — Phil K Nguyen
*Assistant Examiner* — Cheri L Harrington
(74) *Attorney, Agent, or Firm* — Brooks Cameron & Huebsch PLLC

(57) ABSTRACT

Example implementations relate to memory mode categorization. An example boot process modification can include invoking a first service of a client operating system (OS) on top of an enabled host OS, modifying a boot process of the host OS using the first service, and executing applications within the client OS based on the modified boot process of the host OS.

15 Claims, 4 Drawing Sheets

(56) References Cited

U.S. PATENT DOCUMENTS

| | | |
|---|---|---|
| 2009/0138865 A1 | 5/2009 | Furbee et al. |
| 2009/0172384 A1 | 7/2009 | Anson |
| 2010/0125554 A1* | 5/2010 | Jennings ............ G06F 9/45554 |
| | | 707/674 |
| 2012/0084791 A1* | 4/2012 | Benedek ............ G06F 9/45533 |
| | | 719/313 |
| 2012/0084792 A1* | 4/2012 | Benedek ................ G06F 9/544 |
| | | 719/313 |
| 2012/0089992 A1* | 4/2012 | Reeves ................ G06F 3/1431 |
| | | 719/318 |
| 2014/0101425 A1 | 4/2014 | Walters |
| 2014/0298317 A1* | 10/2014 | Devine .................... G06F 9/50 |
| | | 717/174 |
| 2016/0077682 A1* | 3/2016 | Reeves ................ G06F 3/0481 |
| | | 715/733 |
| 2016/0196449 A1* | 7/2016 | Sikka ................. G06F 9/45558 |
| | | 726/30 |

OTHER PUBLICATIONS

Operating-system-level virtualization.
Prince—"Researcher to Reveal Mac OS X DLL Hijacking Attack"—http://www.securityweek.com—Mar. 16, 2015—6 pages.

* cited by examiner

BOOT PROCESS MODIFICATION

BACKGROUND

An operating system (OS) boot process may be part of an initialization of a computerized system, for instance a computer (e.g., computing device, smartphone, gaming system, smartwatch, tablet, etc.), among others. During a boot process, the OS may be loaded into a computerized system's main memory, random access memory, etc. Once the OS is loaded, a user may run an application on the OS.

DETAILED DESCRIPTION

New versions of an OS may be introduced frequently (e.g., every 6 months, once a year, etc.), with each new version supporting new hardware. In turn, new drivers and images, among other things, for the newly supported hardware may be needed. This may result in increased time and resources used each time a new OS version is developed.

Some approaches used when a new OS is introduced include hardware virtualization. This approach may require a large amount of resource overhead, as an entire personal computer (PC) environment may need to be emulated. This approach may also require special drivers to be used on a guest OS to support an emulated hardware environment.

In contrast, examples of the present disclosure allow for the expansion of hardware support (e.g., for the new OS) by utilizing or "hijacking" hardware that is supported by a current OS. For instance, if the current OS boots on a particular system and the expanded hardware is supported, the new OS will run on the expanded hardware.

Put another way, examples of the present disclosure take advantage of an already enabled OS, including its hardware-tuned kernel and driver stack. As used herein, an enabled host OS is an OS that is operational and/or has been activated. For instance, an enabled host OS has been booted and is ready for use by a user (e.g., to run applications). By leveraging the enabled OS, turnover time may be faster as compared to approached that don't leverage an enabled OS, by porting an existing OS (e.g., a Linux environment) for use on another preexisting OS. As a result, in some examples, a host OS and a client OS may run concurrently above a same kernel.

Figure 1:
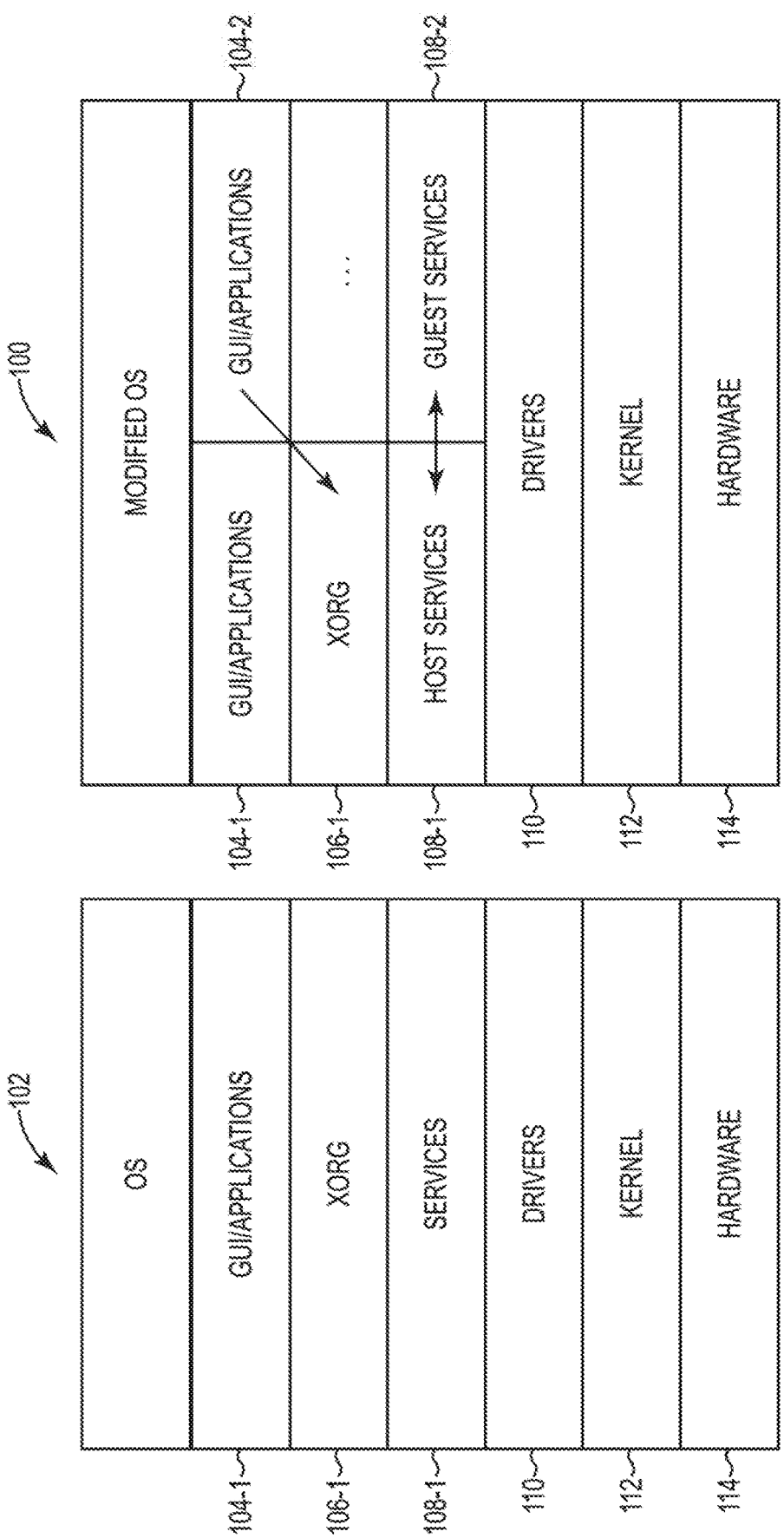
FIG. 1 illustrates a comparison diagram between an OS and a modified OS associated with boot process modification according to an example.

FIG. 1 illustrates a comparison diagram between an OS and a modified OS associated with boot process modification according to an example. OS 102 is an OS that undergoes an unmodified boot process. OS 102 may be a Linux OS, for instance. OS 102 includes a plurality of elements running on the OS including graphical user interface (GUI) and applications 104-1, graphics resource provider (e.g., X-server) 106-1, services 108-1 (e.g., host services), drivers 110, kernel 112, and hardware 114. Applications 104-1, graphics resource provider 106-1, services 108-1 (e.g., host services), drivers 110, kernel 112 may be implemented as machine readable instructions, in some examples. A boot process on OS 102 (e.g., a host OS) may include booting a host kernel, loading drivers, mounting local disks, initializing applications (e.g., services) on the host OS, starting graphics resource provider 106-1, and attaching a display manager to graphics resource provider 106-1. Graphics resource provider 106-1 may be a program that runs on a local machine (e.g., a computer used directly by a user) and handles access to the graphics cards, display screens, and input devices (e.g., keyboard, mouse, etc.) on the local machine. At this point, the boot process may be finished and applications may be executed by a user as desired on the host OS.

Modified OS 100 includes a client OS booted on top of the modified OS 100. Modified OS 100 may be a modified Linux OS, for instance. As used herein, the client OS being booted on top of or run on top of a modified OS or host OS refers to the client OS relying on the modified OS or host OS to provide certain services, as is discussed further herein. Put another way, the client OS running on top of the modified or host OS, as used herein, means the client OS is using services provided by the modified or host OS. Modified OS 100 still runs GUI and applications 104-1, graphics resource provider 106-1, services 108-1, drivers 110, kernel 112, and hardware 114. However, client GUI and applications 104-2 are run on the modified OS's graphics resource provider 106-1, and guest services 108-2 may be run on the modified OS. Running the client elements on the modified, or "host" OS allows for leveraging of an already enabled operating system, which can increase a turnover time and reduce the use of other resources, for example.

A boot process on modified OS 100 may begin in a similar manner as the boot process of OS 102. For instance, the boot process may include booting a host kernel, loading drivers, mounting local disks, initializing applications (e.g., services) on the host OS, and/or starting graphics resource provider 106-1. However, at this point, the modification may begin. For instance, a first service, as is discussed further herein with respect to FIG. 2, may be injected during installation of a "hijacking" package in accordance with the present disclosure.

Figure 2:
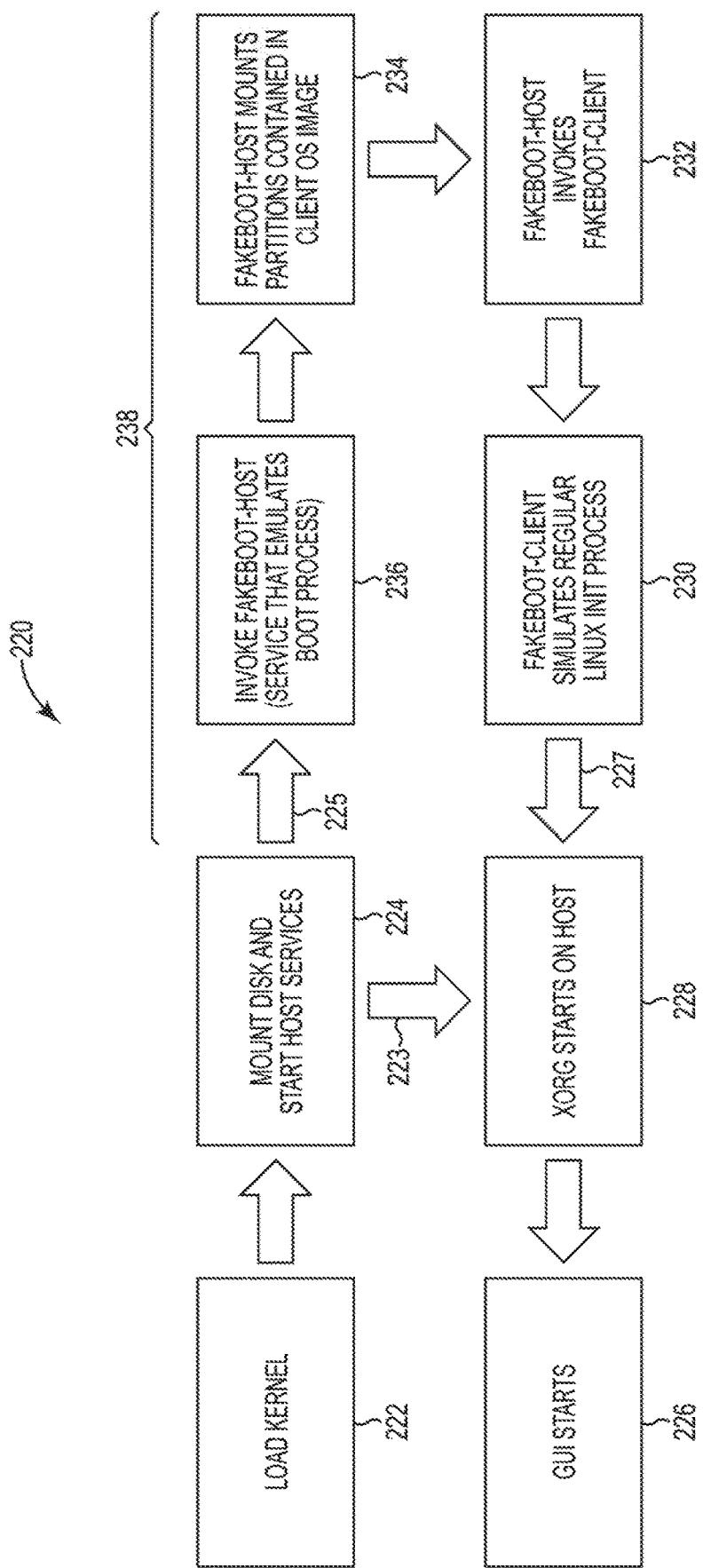
FIG. 2 illustrates a diagram of boot process modification according to example.

FIG. 2 illustrates a diagram 220 of boot process modification according to an example. While the elements of boot process modification are shown in a particular order in FIG. 2, examples are not so limited. The elements may be performed in a different order.

At 222, a kernel is loaded on a system using the host OS. For instance, the power button on a computing device (or other device) is pressed. At 224, disks and/or driver's are mounted, and host services (e.g., services configured in the host OS) and/or applications are started on the host OS.

A client OS is booted on top of the host OS beginning at 236. The host OS boot process is modified so some of the services and boot steps of the host OS are run instead in the client environment. In an example, portion 238 represents the client OS booted on top of the host OS. A first service, referred to herein as a fakeboot-host, is invoked at 236. At 234, the fakeboot-host may mount partitions and/or local disks and start services used by the client OS. Fakeboot-host may mount a client OS image located on a root filesystem of a host OS onto a subdirectory that may serve as a working filesystem root for the client OS. Additionally or alternatively, fakeboot-host may bind-mount virtual partitions (e.g., /dev, /proc, /sys, etc.) of the host OS into the subdirectory of the client OS's root filesystem, such that the client OS has autonomous access of native devices such as Universal Serial Bus (USB) drives, disks, display hardware, etc. As used herein, a bind-mount is a different view of a directory tree as compared to a mount command. A bind mount uses an existing directory tree and replicates the directory tree under a different point. Directories and files in a bind mount are the same as the original. Bind mounting a virtual partition allows for mounting the virtual partition from one path into another path (e.g., allowing for access to native devices).

At 232, the fakeboot-host invokes a second service referred to herein as a fakeboot-client, which is a mechanism used to pass commands and information from the client OS to the host OS. Fakeboot-client may run inside a change operation, in some examples. For instance, the change operation may be an operation that changes an apparent root directory for a current process and its children. An example is a chroot. At 230, the fakeboot-client simulates a host OS (e.g., a Linux OS) initiation process while the client OS is booted on top of the host OS, and when finished, hands back control to the host OS at 227. The modification, or "hijacking" process may end here, and the client OS may take over the rest of the boot process.

In an example, portion 238 may be split into the two aforementioned services, fakeboot-host and fakeboot-client. On the host OS, fakeboot-host mounts partitions and subvolumes in images on the host OS. Fakeboot-host rebind mounts virtual filesystems created by the kernel for the host OS, and invokes the fakeboot-client service in the client OS. On the host, the client OS's display manager may attached to a graphics resource provider (e.g., graphics resource provider 106-1 illustrated in FIG. 1) that was started on the host OS, and a link may be established in order to pass commands to an underlying host OS, which may be used for system management and communication with the host OS from within the client environment.

On the client OS, fakeboot-client emulates successful startup events in the client OS initialization process (e.g., a native boot process). For instance, client applications start based on events that are emitted during initialization, and by emulating startup events in a particular order (e.g., a proper order), the client applications start up in a native manner. For instance, services and/or applications on the client may begin to initialize as normal from the client OS's perspective. In an example, on the client OS, this may be a basic Linux initialization process that happens during a normal boot. Put another way, a user may not know a host OS has been modified in order for their client OS to run properly.

At 228, the host OS can start the graphics resource provider of the host, a display manager may be attached to the graphics resource provider, and at 226, a graphical user interface (GUI) may be started. At this point, the boot process may be complete, and a user may execute applications as desired. In some examples, client applications may be started on the graphics resource provider of the host. For instance, a client graphics resource provider may not be used.

Arrow 223 illustrates a path in which an un-modified boot process may take. For instance, if the client OS is not booted on top of the host OS, subsequent to mounting partitions and/or local disks and starting services at 224 the graphics resource provider and the GUI may be started.

With respect to the client OS and the host OS, the host OS may be constantly running, while the client OS may run over the top of the host OS. The client OS may start up at some point during the boot process of the host OS, and may run in series, in parallel, as a series of events, and/or simultaneously with the host OS.

Figure 3:
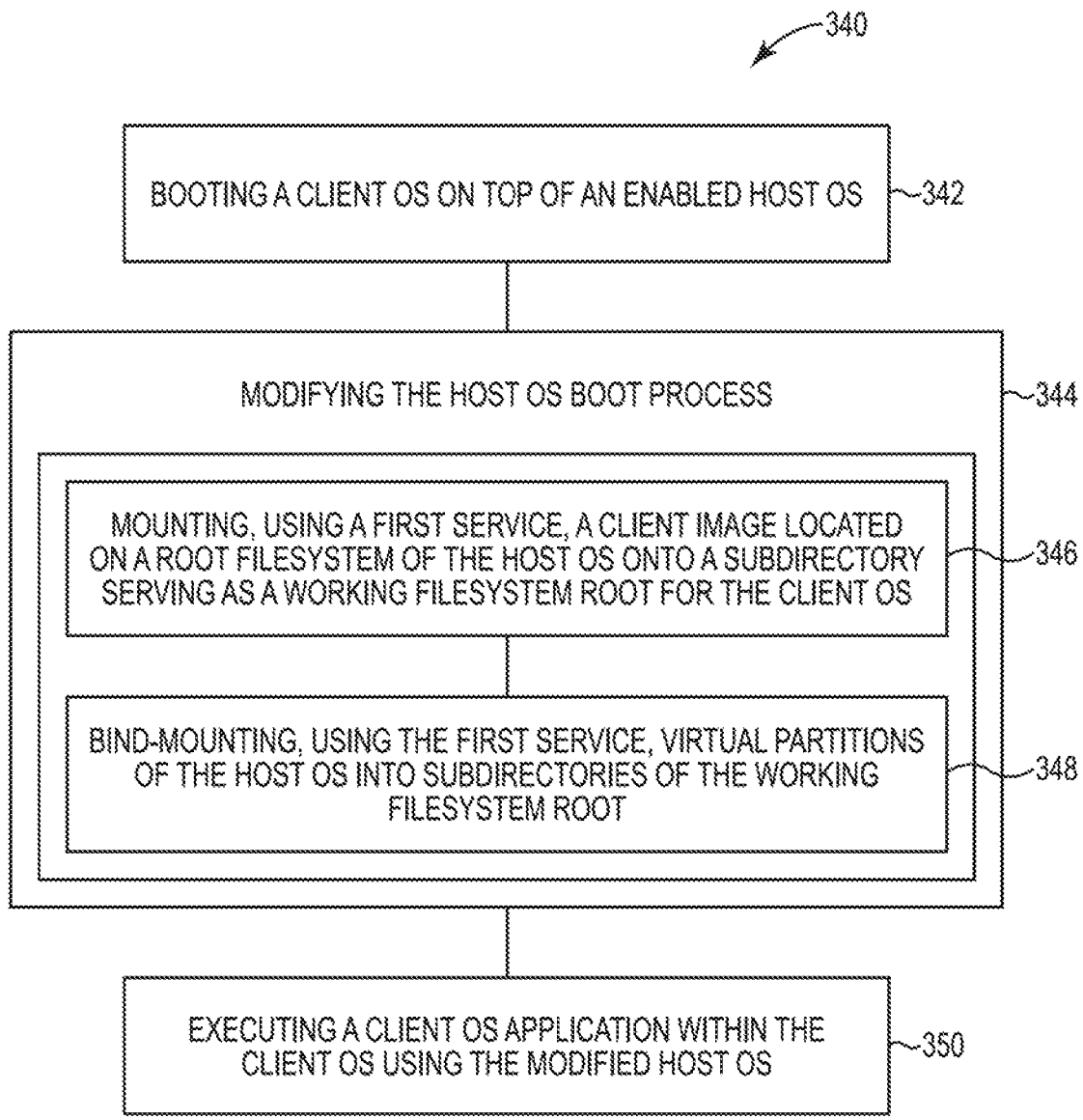
FIG. 3 illustrates a diagram of method for boot process modification according to an example.

FIG. 3 illustrates a diagram of a method 340 for boot process modification according to art example. At 342, a client OS is booted on top of an enabled host OS. In some examples, the host OS and the client OS run concurrently above a same kernel. At 344, the host OS boot process is modified. The modification can include, at 346, mounting a client image located on a root filesystem of the host OS onto a subdirectory serving as a working filesystem root for the client OS using a first service. Alternatively or additionally, the modification may include, at 348, bind-mounting virtual partitions of the host OS into subdirectories of the working filesystem root using the first service.

In some embodiments, modifying the host OS boot process may further include executing, using the first service, a second service inside a change operation. Method 340 may also include the second service emulating startup events in an initialization process of the client OS. The emulating may comprise booting client applications based on events emitted during the initialization process and emulating startup events in a particular order, such that the client applications boot in a native manner.

Modifying the host OS, in some embodiments, may also include mounting partitions and subvolumes in an image on the host OS, rebind mounting virtual filesystems created by a kernel for the host OS, and invoking the second service in the client OS. The client OS may be given autonomous access of native devices to the client OS via the rebind mounting.

At 350, method 340 includes executing a client OS application within the client OS using the modified host OS. For instance, a user may run an application on the client OS without knowing the host OS was modified to allow for it. In an example, updated hardware that may not run on an original OS version may be able to run on a modified version of the original OS in accordance with the present disclosure, as the original OS version may be modified to accommodate changes to the hardware.

Figure 4:
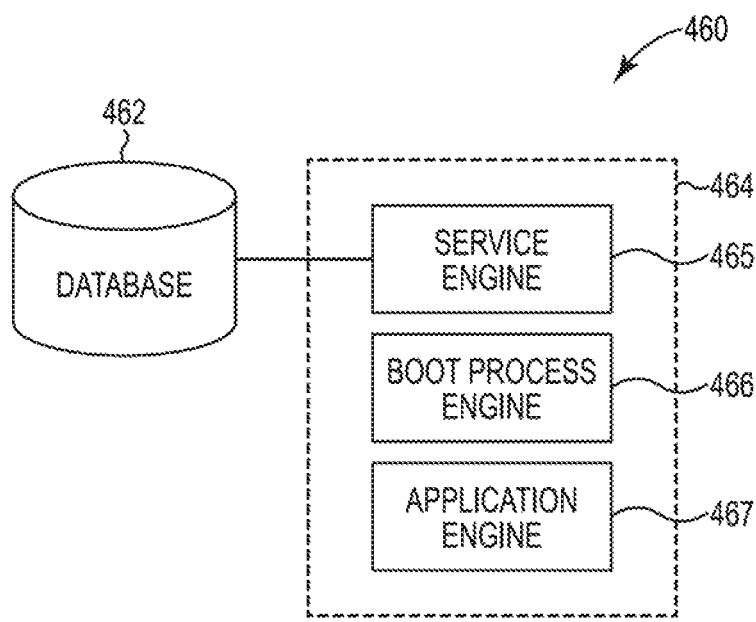
FIG. 4 illustrates a diagram of a system including a database, a subsystem, and a number of engines according to an example.
Figure 5:
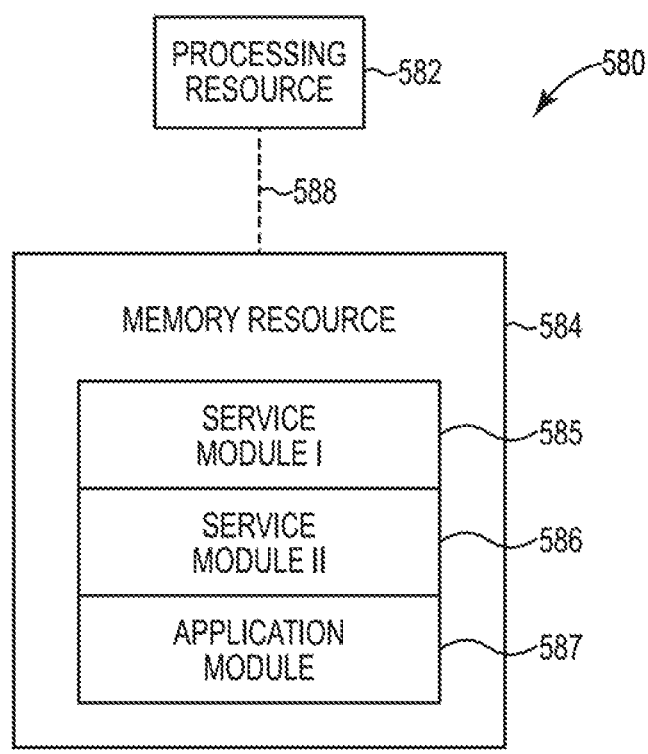
FIG. 5 illustrates a diagram of an example computing device including a processing resource, a memory resource, and a number of modules according to an example.

FIGS. 4 and 5 illustrate examples of system 460 and device 580, respectively, according to the present disclosure. That is, FIG. 4 illustrates a diagram of an example of a system 460 including a database 462, a subsystem 464, and a number of engines 465, 466, 467 according to an example. The subsystem 464 can include the number of engines in communication with the database 462 via a communication link. The system 460 can include additional or fewer engines than illustrated to perform the various functions described herein. The system 460 can represent instructions and/or hardware of a network controller (e.g., system 680 as referenced in FIG. 6, etc.).

The number of engines 465, 466, 467 can include a combination of hardware and programming to perform functions including those described herein. The instructions can include instructions (e.g., software, firmware, etc.) stored in a memory resource (e.g., computer readable medium (CRM), machine readable medium (MRM), etc.) as well as hard-wired program (e.g., logic).

The service engine 465 can include hardware and/or a combination of hardware and instructions to invoke a first service of a client OS on top of an enabled host OS. For instance the first service (fakeboot-host) may be used to start and change elements and processes to allow for modification of the host OS.

The boot process engine 466 can include hardware and/or a combination of hardware and instructions to modify a boot process of the host OS using the first service. To do so, the boot process engine may emulate a boot process of the client OS using the first service. The application engine 467 can include hardware and/or a combination of hardware and instructions to execute applications within the client OS based on the modified boot process of the host OS. For instance, applications may be executed without a user knowing the host OS was modified to make the application execution possible.

System 460 may also include a communication engine (not pictured) that can include hardware and/or a combination of hardware and instructions to facilitate communication between the client OS and the host OS via a second service. In at least one embodiment, the first service is located on the client OS, and the second service is located on the host OS. In some examples, the client OS may be an updated version of the host OS. For instance, the host OS may be a Linux OS, and the client OS may be an updated version of the Linus OS.

FIG. 5 illustrates a diagram of an example computing device 580 including a processing resource 582, a memory resource 584, and a number of modules 585, 586, 587 according to an example. The computing device 580 can utilize instructions (e.g., software and/or firmware) hardware, and/or logic to perform a number of functions including those described herein. The computing device 580 can be a combination of hardware and program instructions configured to share information. The hardware, for example, can include a processing resource 582 and/or a memory resource 584 (e.g., CRM, MRM, database, etc.).

A processing resource 582, as used herein, can include a processor capable of executing instructions stored by a memory resource 584. Processing resource 582 may be implemented in a single device or distributed across multiple devices. The program instructions (e.g., machine-readable instructions (MRI)) can include instructions stored on the memory resource 584 and executable by the processing resource 582 to implement a desired function (e.g., memory mode categorization).

The memory resource 584 can be in communication with a processing resource 582. A memory resource 584, as used herein, can include memory components capable of storing instructions that can be executed by processing resource 582. Such memory resource 584 can be a non-transitory CRM or MRM. Memory resource 584 may be integrated in a single device or distributed across multiple devices. Further, memory resource 584 may be fully or partially integrated in the same device as processing resource 582 or it may be separate but accessible to that device and processing resource 582. Thus, it is noted that the computing device 580 may be implemented on a participant device, on a server device, on a collection of server devices, and/or a combination of the user device and the server device.

The memory resource 584 can be in communication with the processing resource 582 via a communication link (e.g., a path) 588. The communication link 588 can be local or remote to a machine (e.g., a computing device) associated with the processing resource 582. Examples of a local communication link 588 can include an electronic bus internal to a machine (e.g., a computing device) where the memory resource 584 is one of volatile, non-volatile, fixed, and/or removable storage medium in communication with the processing resource 582 via the electronic bus.

A module and or modules 585, 586, 587 can include MRI that when executed by the processing resource 582 can perform a number of functions including those described herein. The number of modules 585, 586, 587 can be sub-modules of other modules. For example, the service module I 585 and service module II 586 can be sub-modules and/or contained within the same computing device. In another example, the number of modules 585, 586, 587 can comprise individual modules at separate and distinct locations (e.g., MRM, etc.).

Each of the number of modules 585, 586, 587 can include instructions that when executed by the processing resource 582 can function as a corresponding engine as described herein. For example, the service module I 585 can include instructions that when executed by the processing resource 582 can function as the service engine 465. Similar, each of the service module II 586 and the application module 587 can include instructions that when executed by the processing resource 582 can function as engines.

In an example, service module I 585 can include instructions that when executed by the processing resource 582 may cause a computing system to modify a boot process of a host OS using a first service. The modification using the first service may include booting a graphics resource provider of the host OS and attaching a display manager of a client OS to the graphics resource provider.

The modification using the first service may also include establishing a communication link between the host OS and the client OS. System management commands may be passed via the link, and using the link, communication may occur with the host OS from within the client OS.

Service module II 586 can include instructions that when executed by the processing resource 582 may cause a computing system to modify the boot process of the host OS using a second service. The modification using the second service may include emitting a list of startup events associated with a native boot process of the client OS and initializing applications on the client OS as normal in a perspective of the client OS.

Application module 587 can include instructions that when executed by the processing resource 582 may cause a computing system to execute client applications in the client OS using the modified boot process.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein may be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. Further, as used herein, "a number of" an element and/or feature may refer to one or more of such elements and/or features.

What is claimed:
1. A machine-readable medium storing instructions executable by a processing resource to cause a computing system to:
invoke a first service of a client operating system (OS) on top of an enabled host OS;

invoke a second service located on the enabled host OS;
modify a boot process of the enabled host OS using the first service and the second service; and
execute applications within the client OS based on the modified boot process of the enabled host OS.

2. The medium of claim 1, further comprising the instructions executable to modify the boot process by emulating a boot process of the client OS using the first service.

3. The medium of claim 1, further comprising the instructions executable to facilitate communication between the client OS and the enabled host OS via the second service.

4. The medium of claim 3, wherein the first service is located on the client OS.

5. The medium of claim 1, wherein the client OS is an updated version of the enabled host OS.

6. A machine-readable medium storing instructions executable by a processing resource to cause a computing system to:
modify a boot process of an enabled host OS using a first service, comprising:
booting a graphics resource provider of the enabled host OS; and
attaching a display manager of a client OS to the graphics resource provider;
modify the boot process of the enabled host OS using a second service, comprising:
emitting a list of startup events associated with a native boot process of the client OS; and
initializing applications on the client OS; and
execute client applications in the client OS using the modified boot process.

7. The machine-readable medium of claim 6, further comprising instructions executable to modify the boot process using the first service and comprising establishing a communication link between the enabled host OS and the client OS.

8. The machine-readable medium of claim 7, further comprising instructions executable to pass system management commands via the link.

9. The machine-readable medium of claim 7, further comprising instructions executable to communicate with the enabled host OS from within the client OS via the link.

10. A method for boot process modification, comprising:
booting a client OS on top of an enabled host OS;
modifying the enabled host OS boot process, comprising:
mounting, using a first service, a client OS image located on a root filesystem of the enabled host OS onto a subdirectory serving as a working filesystem root for the client OS; and
bind-mounting, using the first service, virtual partitions of the enabled host OS into the subdirectory of the working filesystem root; and
executing a client OS application within the client OS using the modified host OS.

11. The method of claim 10, further comprising a second service emulating startup events in an initialization process of the client OS, the emulating comprising:
booting client applications based on events emitted during the initialization process; and
emulating the startup events in a particular order, such that the client applications boot in a native manner.

12. The method of claim 10, further comprising running the enabled host OS and the client OS concurrently above the same kernel.

13. The method of claim 10, wherein modifying the enabled host OS boot process further comprises executing, using the first service, a second service inside a change operation.

14. The method of claim 10, wherein modifying the enabled host OS boot process further comprises:
mounting partitions and subvolumes in an image located on the enabled host OS;
rebind mounting the virtual partitions; and
invoking a second service in the client OS.

15. The method of claim 14, further comprising giving autonomous access of native devices to the client OS via the rebind mounting.

* * * * *